United States Patent [19]
Friedman

[11] Patent Number: 5,845,853
[45] Date of Patent: Dec. 8, 1998

[54] NOZZLE ASSEMBLY FOR EXPELLING A VISCOUS MASS

[76] Inventor: Michael Friedman, 15759 E. Echo Hill Dr., Fountain Hills, Ariz. 85268

[21] Appl. No.: 759,252

[22] Filed: Dec. 2, 1996

[51] Int. Cl.⁶ .................................................. B05B 1/30
[52] U.S. Cl. .................. 239/584; 239/590.5; 222/559; 425/464
[58] Field of Search ..................... 239/583, 584, 239/590, 590.5; 222/504, 559; 425/564, 566, 568, 571

[56] References Cited

U.S. PATENT DOCUMENTS

| | | | |
|---|---|---|---|
| 886,513 | 5/1908 | Johnston | 239/583 X |
| 3,461,498 | 8/1969 | Ramaika | 425/568 X |
| 3,499,605 | 3/1970 | Dreisin | 239/590.5 X |
| 3,952,927 | 4/1976 | Schaumburg et al. | 425/564 X |
| 4,272,236 | 6/1981 | Rees et al. | 425/564 |
| 4,412,807 | 11/1983 | York | 425/564 |
| 5,067,893 | 11/1991 | Osuna-Diaz | 425/564 |

*Primary Examiner*—Andres Kashnikow
*Assistant Examiner*—Steven J. Ganey
*Attorney, Agent, or Firm*—Parsons & Goltry; Michael W. Goltry; Robert A. Parsons

[57] ABSTRACT

A nozzle assembly for expelling a viscous mass, comprising a nozzle having an open inlet end for receiving a viscous mass, an open outlet end for expelling the viscous mass, and a bore extending therethrough for communicating the viscous mass from the open inlet end to the open outlet end, a valve pin, extending through the bore of the nozzle, having a valve tip movable between an extended position for closing the open outlet end, and a retracted position for opening the open outlet end, a sleeve carried within the bore of the nozzle for guiding the valve pin between the extended position and the retracted position.

16 Claims, 3 Drawing Sheets

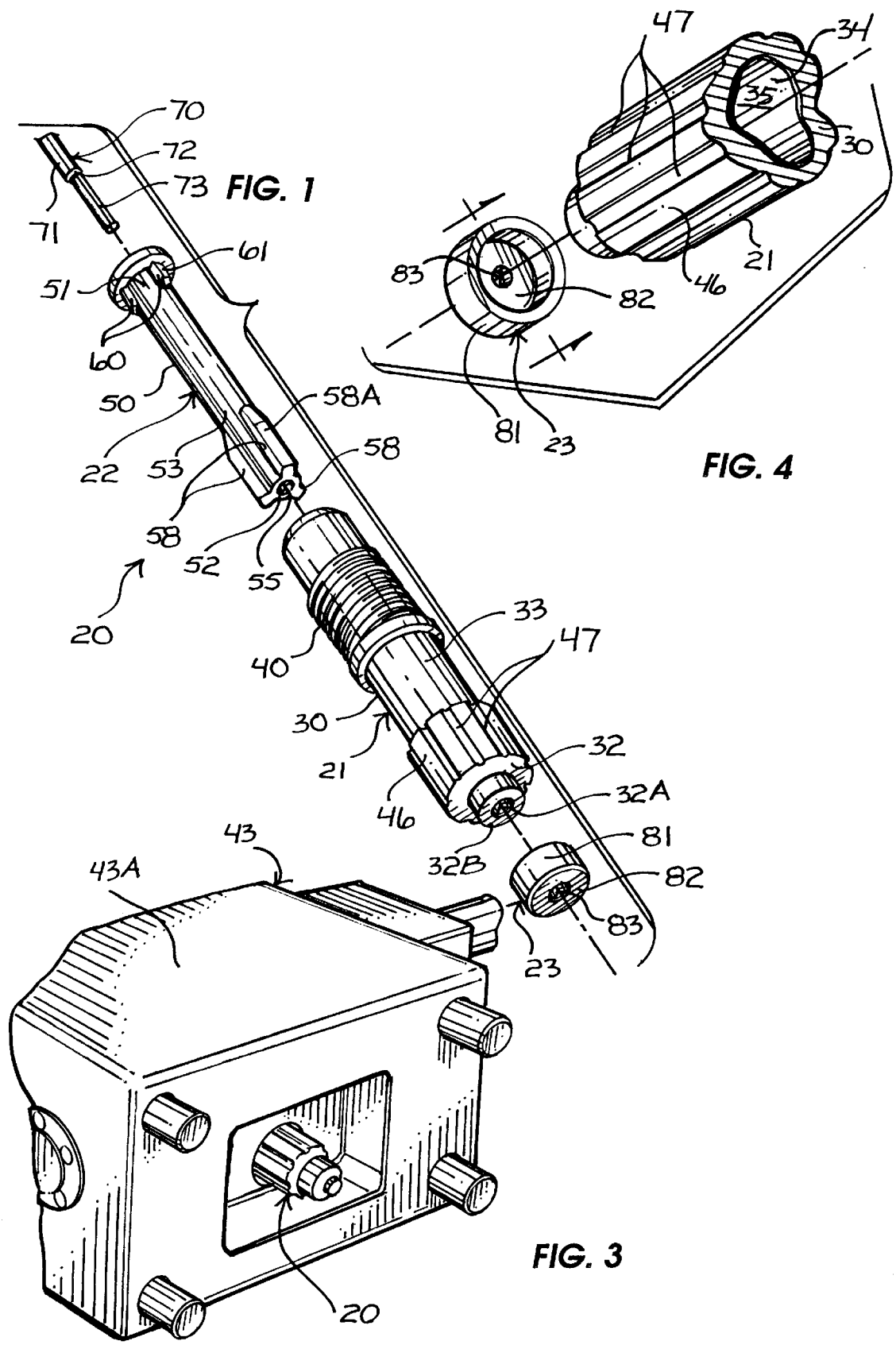

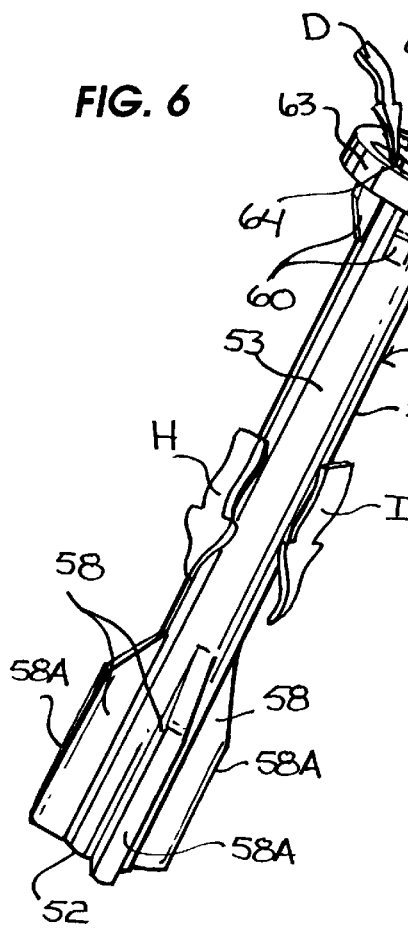
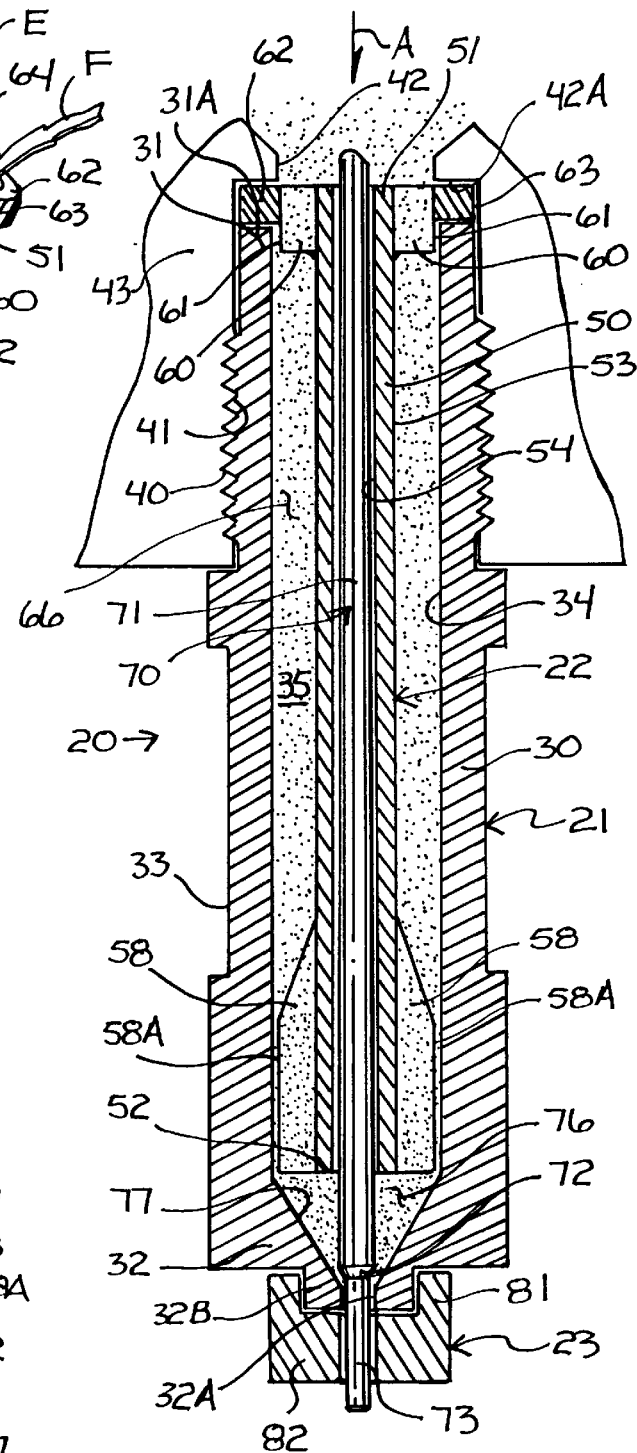
FIG. 6
FIG. 2
FIG. 5

NOZZLE ASSEMBLY FOR EXPELLING A VISCOUS MASS

BACKGROUND OF THE INVENTION

1. Field of the Invention

This invention relates to nozzles.

More particularly, this invention relates to nozzle assemblies.

In a further and more specific aspect, the instant invention relates to a nozzle assembly for use with an apparatus for injecting a viscous mass.

2. Prior Art

The techniques used for shaping and finishing plastics depends on three factors: time, temperature and flow (also known as deformation). Many of the processes are cyclic in nature, although some fall into the categories of continuous or semicontinuous operation. One of the most widely used operations is that of injection molding. Injection molding differs from other operations, such as compression molding, in that the plastic material is normally rendered fluid in a chamber and then forced into a mold through a gate by external pressure. The mold is cooled and split, the two halves being locked by pressure during molding and opening automatically when the mold cavity has been filled by a shot of the liquefied plastic. The cooled article is then ejected form the mold and the process repeated. It will be understood by those having ordinary skill that not all molds are valve gated. For instance, some are hot drops, cold runners, hot runners or other means suitable for rendering plastic into a molten state and injecting it into a cavity of the mold.

In its simplest form, an injection molding apparatus consists of a heated barrel with a hydraulically operated ram, an opening in a top or rearward portion of the barrel being fitted with a hopper into which measured amounts of plastic pellets are fed. Falling in front of a plunger, the pellets are forced under high pressure into a heating section of the barrel, pushing out an equivalent volume of molten plastic into the mold. A torpedo-shaped distributor is fixed between the end of the ram and a nozzle feeding the mold.

Of the various methods used to speed preplasticization, the most common involves a reciprocating screw feed that builds up a shot of molten plastic behind the nozzle, moving backward against the injection ram pressure until an electrical device stops rotation and the screw operates as a ram to force the plastic into the mold. The two halves of the mold are normally clamped at a pressure that resists that exerted by the plastic entering the mold. This is usually achieved by a hydraulic ram or by a hydraulically operated toggle mechanism; the nozzle may be fitted with a device to prevent premature leakage of plastic at the nozzle and permit high pressure buildup before the shot.

In most injection molding apparatus, the valve gate may be either turned on for injecting plastic through the nozzle, or turned off for stopping or inhibiting the flow of plastic through the nozzle. Normally, the nozzle includes a nozzle tip having a small aperture through which molten plastic is passed. Some injection molding apparatus use a reciprocating valve pin or piston movable between an extended position for closing the nozzle tip for stopping the flow of molten plastic therethrough, and a retracted position for opening the nozzle tip for allowing molten plastic to flow therethrough.

Thus, in many conventional systems, the valve pin reciprocates in and out of the nozzle tip for systematically opening and closing the nozzle tip. However, as the valve pin reciprocates, the tip of the valve pin periodically impacts the region of the nozzle around the nozzle tip causing damage to the valve gate including not only the valve pin, but also the area inside the nozzle tip. When the valve gate or the piston becomes damaged, operation of the injection molding apparatus becomes impaired resulting in imperfections in the manufacture of the molded parts due to flashing, stringing, molded-in-contamination and leaking plastic through the damaged valve gate. In order to effect repair of damaged portions of the valve gate, the injection molding apparatus must be shut down, and the valve gate torn down and disassembled at considerable expense resulting from not only from instrument down time, but also the parts and labor associated with the repair. These and other deficiencies inherent in the prior art necessitate certain new and useful improvements. Accordingly, it would be beneficial to provide a valve gate that is not easily damaged over extended use, that requires very little periodic maintenance, and that eliminates product imperfections.

It would be highly advantageous, therefore, to remedy the foregoing and other deficiencies inherent in the prior art.

Accordingly, it is an object of the present invention to provide a nozzle assembly for use with an injection molding apparatus.

Another object of the present invention is to provide a nozzle assembly for use with an injection molding apparatus that is easy to construct.

And another object of the present invention is to provide a nozzle assembly for use with an injection molding apparatus that is easy to install.

Still another object of the present invention is to provide a nozzle assembly for use with an injection molding apparatus that may be used with existing injection molding apparatus without appreciable modifications.

Yet another object of the instant invention is to provide a nozzle assembly for use with an injection molding apparatus decreases instrument down time.

Yet still another object of the instant invention is to provide a nozzle assembly for use with an injection molding apparatus that maximizes molded product production.

And a further object of the invention is provide a nozzle assembly for use with an injection molding apparatus that substantially eliminates damage to the valve gate area over an extended period of operation.

Still a further object of the immediate invention is to provide a nozzle assembly for use with an injection molding apparatus that eliminates flash.

Yet a further object of the invention is to provide a nozzle assembly for use with an injection molding apparatus that eliminates stringing.

And still a further object of the invention is to provide a nozzle assembly for use with an injection molding apparatus that eliminates molded-in-contamination.

Another object of the present invention is to provide a nozzle assembly for use with an injection molding apparatus that eliminates leaking at the valve gate.

Yet another object of the present invention is to provide a nozzle assembly for use with an injection molding apparatus that prevents leaking at the sealing diameter of the nozzle housing.

SUMMARY OF THE INVENTION

Briefly, to achieve the desired objects of the instant invention in accordance with a preferred embodiment thereof, provided is a nozzle assembly comprising a nozzle, a nozzle insert, and a cavity insert. The nozzle includes a continuous sidewall having an open inlet end, an open outlet end, and a continuous inner surface defining an inner nozzle diameter defining a bore extending therethrough. The nozzle insert is comprised of a sleeve including a continuous sidewall having an open upper end, and open lower end, a continuous inner surface defining a bore extending therethrough, and a continuous outer surface defining an outer sleeve diameter.

The sleeve is removably fixed axially within the bore of the nozzle with the open lower end positioned intermediate the open inlet end and the open outlet end of the nozzle. When positioned within the bore of the nozzle, the open upper end of the sleeve is positioned proximate the open inlet end, and the open lower end of the sleeve is positioned proximate to but spaced from and diametrically opposed to the open outlet end of the nozzle, the continuous outer surface of the sleeve being spaced from the continuous inner surface of the nozzle thereby defining a continuous passageway between the open inlet end and the open outlet end for permitting viscous mass to flow into the inlet end of the nozzle, through the continuous passageway surrounding the sleeve, and out through the open outlet end of the nozzle.

A valve pin is also provided having a main shaft slidingly and sealing mounted for reciprocating movement within the bore of the sleeve. The valve pin includes a valve tip designed for reception in the outlet end. The valve pin reciprocates between an extended position, wherein the valve tip is received in and through the open outlet end for closing the open outlet end for inhibiting viscous mass to pass therethrough, and a inwardly retracted position, wherein the valve tip is removed from the open outlet end for opening the outlet end for permitting viscous mass to pass therethrough. During operation, the sleeve is operative for guiding the valve pin between the extended position and the retracted position for preventing the valve tip from impacting the area in and around the open outlet end of the nozzle, thus preventing damage to the valve tip and the area in and around the open outlet end during extended use.

In a specific application, the inlet end of the nozzle is engagable to an inflow of a conventional injection molding apparatus well known to those having ordinary skill. The cavity insert is detachably engagable to the open outlet end of the nozzle and sealingly engagable to a cavity interconnecting the nozzle with a mold. The cavity insert includes bore communicating with the open outlet end when engaged thereto for receiving therethrough the valve tip when disposed in said extended position and for receiving and communicating viscous mass therethrough and into and therethrough the cavity when the valve tip is disposed in the retracted position.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings in which:

FIG. 1 is an exploded perspective view of a nozzle assembly for expelling a viscous mass, in accordance with a preferred embodiment of the present invention;

FIG. 2 is a cutaway view of the nozzle assembly of FIG. 1 shown as it would appear assembled and in use in combination with an injection molding apparatus, in accordance with a preferred embodiment of the present invention;

FIG. 3 is a fragmented perspective view of a valve gate region of an injection molding apparatus having the nozzle assembly of FIG. 1 coupled thereto, in accordance with a preferred embodiment of the present invention;

FIG. 4 is a fragmented exploded perspective view of a nozzle and a cavity insert of the nozzle assembly of FIG. 1, in accordance with a preferred embodiment of the present invention;

FIG. 5 is a view somewhat similar to the view of FIG. 2 with a valve pin shown in a retracted position, in accordance with a preferred embodiment of the present invention;

FIG. 6 is a perspective view of a sleeve of the nozzle assembly first illustrated in combination with FIG. 1, the sleeve having a plurality of inlet openings located proximate an upper end thereof operative for admitting molten plastic therethrough, in accordance with a preferred embodiment of the present invention;

DETAILED DESCRIPTION OF THE PREFERRED EMBODIMENT

Figure 7:
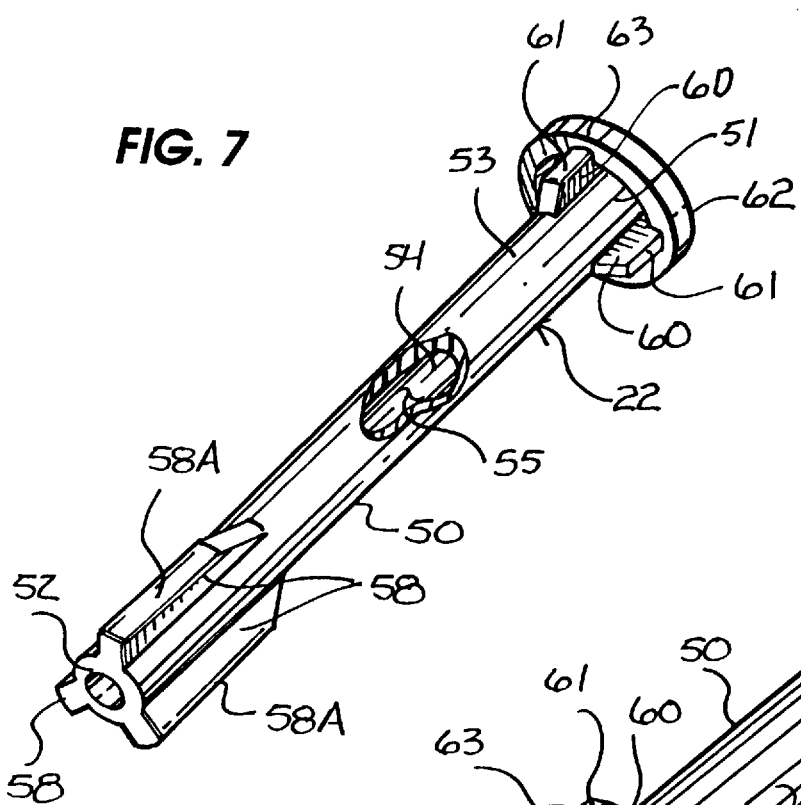
FIG. 7 is a perspective view of the sleeve of FIG. 6, with portions therein broken away for the purpose of illustration, in accordance with a preferred embodiment of the present invention.
Figure 8:
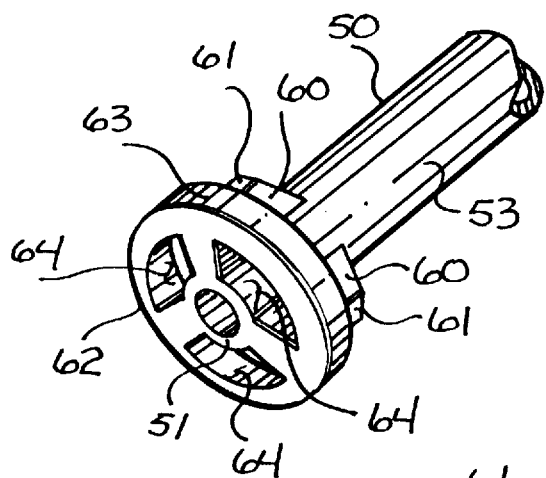
FIG. 8 is a fragmentary perspective view of the top of an upper end of the sleeve shown in FIG. 6, in accordance with a preferred embodiment of the present invention.
Figure 9:
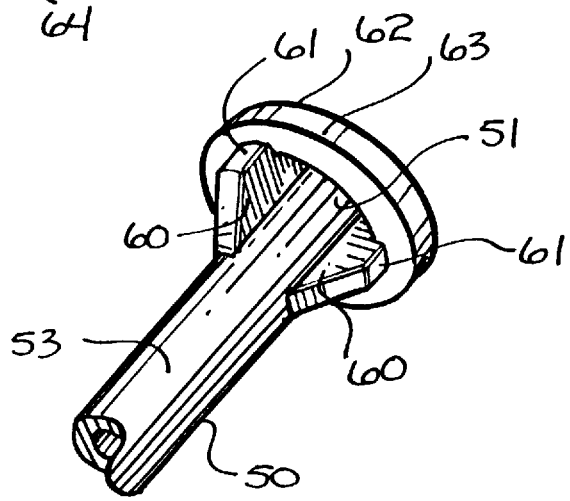
FIG. 9 is a fragmentary perspective view of the bottom of the upper end of the sleeve shown in FIG. 6, in accordance with a preferred embodiment of the present invention.

Turning now to the drawings, in which like reference characters indicate corresponding elements throughout the several views, attention is first directed to FIG. 1 which illustrates an exploded perspective view of a nozzle assembly 20 for expelling a viscous mass, in accordance with a preferred embodiment of the present invention. Nozzle assembly 20 includes a nozzle 21, a sleeve or nozzle insert 22 removably coupled within nozzle 21, and a cavity insert 23 detachably engagable to a nozzle tip 32B of nozzle 21. Although other applications may be exploited, nozzle assembly 20 is of the variety normally associated with conventional injection molding apparatus. Details of an injection molding apparatus have not been specifically illustrated and will not be herein specifically described as they will be readily understood by those having ordinary skill. However, in order to make a full disclosure of the instant invention, discussion of a conventional injection molding apparatus will be made only to the extent necessary to facilitate the disclosure of the instant invention.

With continuing reference to FIG. 1 and additional reference to FIG. 2, illustrating a cutaway view of nozzle assembly 20 shown as it would appear assembled and in use in combination with an injection molding apparatus 43, nozzle 21 is generally elongate and is comprised of a continuous sidewall 30 having open inlet end 31 and open outlet end 32 having aperture 32A formed through nozzle tip 32B, nozzle tip 32B having a generally cylindrical configuration. A continuous generally cylindrical outer surface 33 defines an outer diameter of nozzle 21 and a continuous generally cylindrical inner surface 34 defines an inner diameter which further defines nozzle bore 35 extending therethrough from open inlet end 31 to open outlet end 32. Preferably integrally formed of a beryllium copper alloy, titanium, H-13 steel, stainless steel, or other material having similar structural and functional characteristics, nozzle 21 further includes threaded engagement element 40 disposed proximate to but spaced from open inlet end 31. Threaded engagement element 40 is operative for detachable and threaded engagement with complemental threaded engagement element 41 of inflow 42 of injection molding apparatus 43, although other engagement means may be used. As best shown in FIG. 1 and FIG. 4, a raised aspect 46 having a plurality of longitudinally extending grooves 47 is provided proximate open outlet end 32 which may be easily grasped or clamped for allowing a user to manually or mechanically rotate nozzle 21 in a certain direction for engaging threaded engagement element 40 to complemental threaded engagement element 42 and for threadably tightening nozzle 21 within molten plastic inflow 42.

It will be readily understood by those having ordinary skill, that inflow 42 is typical of a variety of common injection molding apparatus, and is operative for communicating molten plastic from a remote source not shown. Open inlet end 31 of nozzle 21 provides fluid communication between inflow 42 and nozzle 21.

As shown in FIG. 2, only inflow 42 of injection molding apparatus 43 is shown. Further details, not herein specifically illustrated nor described, will be readily understood by those skilled in the art. However, for the purpose of orientation, illustrated in FIG. 3 is a perspective view of nozzle assembly 20 shown as it would appear threadably engaged to a valve gate region 43A of injection molding apparatus 43. For further reference, injection molding apparatus 43 is considered to be generally representative of apparatus for injecting or emitting a viscous mass, such as molten plastic, from an inflow.

With continuing reference to FIG. 1, and additional reference to FIG. 6 and FIG. 7, nozzle insert 22 is generally elongate and includes a continuous sidewall 50 having an open upper end 51 and an open lower end 52. A continuous generally cylindrical outer surface 53 defines an outer diameter and a continuous generally cylindrical inner surface 54 defines an inner diameter which further defines a nozzle insert bore 55 extending therethrough from open upper end 51 to open lower end 52. Preferably integrally formed of a beryllium copper allow, titanium, H-13 steel, stainless steel, or other material having similar structural and functional characteristics, nozzle insert 22 further includes a plurality of equally spaced-apart longitudinally disposed outwardly radially extending fins 58 extending upwardly from open lower end 52 of continuous sidewall 50. Fins 58 each terminate radially outwardly with an outer endwall 58A that collectively define a diameter somewhat less than the inner diameter of nozzle 21 defined by generally cylindrical inner surface 34.

Nozzle insert 22 also includes a plurality of equally spaced-apart longitudinally disposed flange elements 60 extending radially outwardly proximate open upper end 51 of continuous sidewall 50. Each flange element 60 terminates radially outwardly with an outer endwall 61 and are interconnected at an upper portion thereof by a circumferentially disposed wheel 62 having substantially cylindrical outer surface 63 defining an outer wheel diameter approximately the same size as the outer diameter of nozzle 21 as defined by generally cylindrical outer surface 33. Outer endwalls 61 of flange elements 60 collectively define an outer diameter somewhat less than the inner diameter of nozzle 21 as defined by generally cylindrical inner surface 34. As can be seen in FIGS. 6–9, a plurality of inlet openings 64 are provided in-between flange elements 60 and wheel 62, further details of which will be discussed shortly.

With reference back to FIG. 2, nozzle insert 22 is slidably and removably or detachably coupled to nozzle 21 within nozzle bore 35 of nozzle 21 with generally cylindrical outer surface 53 of nozzle insert 22 being spaced from generally cylindrical inner surface 34 of nozzle 21 thereby defining a continuous passageway 66 therebetween extending from open inlet end 31 to open outlet end 32. Nozzle insert is axially disposed therein with open lower end 52 positioned intermediate open inlet end 31 and open outlet end 32 of nozzle 21, with open lower end 52 being further positioned in spaced-apart and diametrically opposed relation with aperture 32A. Open upper end 51 of nozzle insert is positioned proximate open inlet end 31 of nozzle 21. Wheel 62 rests upon rim 31A of open inlet end 31 of nozzle 21. When nozzle 21 is threadably engaged with inflow 42 and rotated in a predetermined direction for threadably securing nozzle 21 to inflow 42, the inherent inwardly directed force will exert a compressive influence upon wheel 62 for the purpose of providing sealing engagement between rim 31A and wheel 62, and between wheel 62 and endwall 42A of inflow 42, thereby securing nozzle insert 22 in place.

When positioned within nozzle bore 35, outer endwalls 61 of flange elements 60 engage portions of generally cylindrical inner surface 34 of nozzle 21 proximate open inlet end 31, and outer endwalls 58A of fins 58 engage portions of generally cylindrical inner surface 34 of nozzle 21 proximate open outlet end 32. As a result, flange elements 60 and fins 58 operate as an alignment means for securingly aligning nozzle insert 22 in axial alignment within nozzle bore 35.

As can be seen in FIG. 1 and FIG. 2, valve pin 70 is provided in combination with injection molding apparatus 43. Like conventional valve pins provided in many injection molding apparatus, valve pin 70 is operative for systematically and periodically opening and closing nozzle assembly 20 during operation by virtue of reciprocating movement. In particular, valve pin 70 generally includes a main shaft 71 mounted to injection molding apparatus 43 for axial reciprocating movement between an extended position and a retracted position. Main shaft 71 includes an outer diameter somewhat smaller than the inner diameter of nozzle insert 22 as defined by generally cylindrical inner surface 54, and extends downwardly to beveled edge 72 leading to and terminating with valve tip 73 having an outer diameter somewhat smaller than the outer diameter of aperture 32A extending through nozzle tip 32B. Valve pin 70 extends through inflow 42 of injection molding apparatus 43 and is guidingly received within nozzle insert bore 55. The inner diameter of nozzle insert 22 defining nozzle insert bore 55 is sized for sealingly and slidingly receiving main shaft 71 in accordance with standard tolerances as will be appreciated by those having ordinary skill. As a result of the sealing engagement between main shaft 71 and nozzle insert bore 55, molten plastic is prevented from entering and flowing therebetween and through nozzle insert bore 55. In the extended position shown in FIG. 2, further details of which will be discussed shortly, valve tip 73 extends beyond open lower end 52 of nozzle insert 22 and is sealingly and slidably received in and through aperture 32A formed through nozzle tip 32B.

As herein previously discussed, valve pin 70 is mounted to injection molding apparatus 43 for axial reciprocating movement between an extended position shown in FIG. 2, and a retracted position as shown in FIG. 5. During operation of injection molding apparatus 43, molten plastic is provided, usually under pressure, through inflow 42 in the direction indicated by the arrowed line A in FIG. 2. As the molten plastic travels through inflow 42, it enters through open inlet end 31 of nozzle 21 by first passing through inlet openings 64 of nozzle insert 22 as indicated by arrows labeled D, E and F in FIG. 6. The molten plastic then travels through open inlet end 31 of nozzle 21, into continuous passageway 66 and flows downwardly in the direction indicated by arrows H and I in FIG. 6 for receipt within a funnel-shaped valve gate chamber 76 defined as the area between open lower end 52 of nozzle insert 22 and open outlet end 32 of nozzle 21. Valve gate chamber 76 includes a funnel-shaped sidewall 77 operative for channeling molten plastic toward aperture 32A.

During operation, nozzle assembly 20 may be either opened for permitting molten plastic to flow through aperture 32A for receipt into a selected mold (not shown), or closed for preventing molten plastic to flow through aperture 32A. This task is accomplished through the selective reciprocating motion of valve pin 70 between the extended position and the retracted position. In the extended position (FIG. 2), valve tip 73 is extended outwardly and is slidingly and sealing received within and through aperture 32A thus inhibiting molten plastic from flowing therethrough. In the retracted position (FIG. 5), valve pin 70 is retracted inwardly into valve gate chamber 76 thus opening aperture 32A and allowing molten plastic 25 to flow outwardly therefrom as plainly seen.

As valve pin 70 reciprocates between the extended and retracted position, nozzle insert is operative as a means for guiding valve tip 73 into and through aperture 32A. As a result, unlike convention valve gate nozzle assemblies, during the reciprocating movement of valve pin 70 between the extended and retracted position, valve tip 73 is prevented from impacting and thereby damaging portions of either the valve gate chamber 76 in and around aperture 32A, or portions of valve tip 73. In addition, the cavity in which nozzle tip 32B resides is also free from risk of damage because valve pin 70 is guided through nozzle 21 by nozzle insert 22, and up to the cavity by cavity insert 23. Damage to the cavity, which is not shown, is thus eliminated. It will be readily understood by those having ordinary skill that even minimal damage to the cavity can lead to considerable instrument down time in order to effect repair or replacement of the damaged cavity. Having a damaged cavity contributes to imperfection in molded parts, such as flash, molded in contamination, high gates, stringing, pulling and tearing of the plastic, all which contribute to imperfections in molded parts which are undesirable and/or not within acceptable manufacturing tolerances. Those of ordinary skill will readily understand the benefits of having a guided valve pin. Guiding the valve pin into the cavity, which could be comprised of a variety of configurations depending of the specific molding application.

In order to further align valve tip 73 through aperture 32A, provided is cavity insert 23, a cup-like member preferably constructed of titanium or other material having similar structural and functional characteristics. Cavity insert 23 includes continuous upright sidewall 81 and an endwall 82 having bore 83 therethrough with a diameter somewhat larger than the outer diameter of nozzle tip 73. Cavity insert 23 is sized to be frictionally and detachably received about nozzle tip 32B as shown in FIG. 2, so that in the extended position, valve tip 73 extends within and through bore 83, bore 83 being coextensive with aperture 32A of nozzle tip 32B. In like manner, when valve pin 70 is disposed in the retracted position (FIG. 2), molten plastic is permitted to pass through bore 83.

It will be readily understood by those having ordinary skill, that although cavity insert 23 is shown having a generally cup-like configuration, cavity insert 23 may be constructed of any suitable shape or configuration suitable for receipt within a selected cavity (not shown). With respect to a preferred embodiment of the instant invention, cavity insert 23 is sized for sealing engagement with the cavity. This eliminates the possibility of molten plastic leaking by nozzle tip 32B and migrating back into injection molding apparatus 43. When molten plastic leaks back into injection molding apparatus 43, it is wasted. As a result, because predetermined volumes of molten plastic are introduced through the nozzle assembly 20 for receipt into the mold for producing the molded part, the loss in volume of the molten plastic due to this leakage results in a lower volume of molten plastic entering the mold. Therefore, the predetermined volume of molten plastic has to be adjusted or increased in order to accommodate the lost volume. Additionally, it will be understood that all injection molding apparatus require periodic cleaning and maintenance. When an injection molding apparatus is shut down for maintenance, like injection molding apparatus 43, the molten plastic that leaked back into the injection molding apparatus 43 has become hardened, degraded, and deposited on a considerably large area of the mechanical working parts of injection molding apparatus 43 such as the manifold and all of the electrical wiring leading to and from the manifold and all areas in and around inflow 42. This hardened deposited plastic is extremely difficult and time consuming to remove. Additionally, because this hardened plastic is so difficult to remove, damage to the parts of injection molding apparatus 43 the hardened plastic is removed from can become irreparably damaged as a result of the cleaning process. Additionally, every time injection molding apparatus 43 leaks, or any injection molding apparatus, production of molded parts must be stopped so that the leak may be fixed prior to continuing the production run.

It will be understood from the foregoing discussion of nozzle assembly 20, that valve pin 70 is totally encased in nozzle insert 22 throughout substantially the entire length of nozzle 21 from open upper end 31 to open lower end 32. As a result the plastic only hits valve pin 70 toward tip 73 thereof, and valve pin 70 is guided in perfect axial alignment in and through nozzle 21 thereby eliminating any possibility of damage to nozzle 21, nozzle insert 22, or the cavity as valve pin 70 reciprocates. This structural configuration additionally serves to separate the plastic from valve pin 70 along substantially its entire length extending through nozzle 21. When valve pin 70 is extended, valve tip 73 of valve pin 70 extends beyond open lower end 52 of nozzle insert 22 and pushes the plastic out of the way residing between open lower end 52 of nozzle insert 22 and nozzle tip 32B.

It will be readily understood that during operation, nozzle assembly 20, including valve pin 70, is heated with heaters (not shown) so that the molten plastic passing therethrough does not harden and clog nozzle assembly 20. This feature is common with many conventional injection molding apparatus, and the specific details of such will not be herein specifically addressed.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A nozzle assembly, comprising:
   a nozzle including a continuous sidewall having an open inlet end for receiving a viscous mass, an open outlet end for expelling said viscous mass, and a bore extending therethrough for communicating the viscous mass from said open inlet end to said open outlet end;

a valve pin extending therethrough said bore of said nozzle, said valve pin having a valve tip movable between an extended position for blocking said open outlet for inhibiting viscous mass to flow therethrough, and a retracted position for unblocking said outlet end for allowing viscous mass to flow therethrough;

an elongate sleeve carried by said nozzle and having a bore extending therethrough operative for guidingly receiving said valve pin for guiding said valve pin between said extended position and said retracted position; and a plurality of spaced-apart fins extending radially outward from said sleeve, each having an outer endwall for engagement to said bore of said nozzle for aligning said elongate sleeve within said bore of said nozzle in substantially axial alignment.

2. The nozzle assembly of claim 1, wherein said elongate sleeve is detachably engagable to said bore of said nozzle.

3. The nozzle assembly of claim 1, wherein said valve pin is slidingly and sealingly engagable to said bore of said elongate sleeve.

4. The nozzle assembly of claim 1, wherein said alignment means further includes a plurality of spaced-apart flange elements extending radially outward from said sleeve, each having an outer endwall for engagement to said bore of said nozzle, said plurality of spaced-apart flange elements spaced from said plurality of spaced-apart fins.

5. The nozzle assembly of claim 1, wherein said guide means further includes an alignment member detachably engagable to said outlet end of said nozzle, said alignment member having a bore extending therethrough operative for receiving said valve pin therethrough when disposed in said extended position.

6. A nozzle assembly, comprising:

a nozzle including a continuous sidewall having an open inlet end for receiving a viscous mass, an open outlet end for expelling said viscous mass, and a bore extending therethrough for communicating the viscous mass from said open inlet end to said open outlet end;

a valve pin extending therethrough said bore of said nozzle, said valve pin having a valve tip movable between an extended position for blocking said open outlet for inhibiting viscous mass to flow therethrough, and a retracted position for unblocking said outlet end for allowing viscous mass to flow therethrough;

a sleeve having an open upper end, an open lower end, and a bore extending therethrough communicating said open upper end with said open lower end, said sleeve housed axially within, and detachably engaged to, said bore of said nozzle in spaced relation to said continuous sidewall, said open lower end of said sleeve positioned intermediate said inlet end and said outlet end of said nozzle in spaced-apart and diametrically opposed relation to said outlet end, said bore of said sleeve being operative for receiving said valve pin therethrough for guiding said valve pin between said extended position and said retracted position; and alignment means for aligning said sleeve within said bore of said nozzle in substantially axial alignment.

7. The nozzle assembly of claim 6, wherein said valve pin is slidingly and sealingly engagable to said bore of said sleeve.

8. The nozzle assembly of claim 6, wherein said alignment means includes a plurality of spaced-apart fins extending radially outward from said sleeve, each having an outer endwall for engagement to said bore of said nozzle.

9. The nozzle assembly of claim 8, wherein said alignment means further includes a plurality of spaced-apart flange elements extending radially outward from said sleeve, each having an outer endwall for engagement to said bore of said nozzle, said plurality of spaced-apart flange elements spaced from said plurality of spaced-apart fins.

10. The nozzle assembly of claim 6, wherein said guide means further includes an alignment member detachably engagable to said outlet end of said nozzle, said alignment member having a bore extending therethrough operative for receiving said valve pin therethrough when disposed in said extended position.

11. A nozzle assembly, comprising:

a nozzle including a continuous sidewall having an open inlet end for receiving a viscous mass, an open outlet end for expelling said viscous mass through into and through a cavity, and a bore extending therethrough for communicating the viscous mass from said open inlet end to said open outlet end;

a valve pin extending therethrough said bore of said nozzle, said valve pin having a valve tip movable between an extended position for blocking said open outlet for inhibiting viscous mass to flow therethrough, and a retracted position for unblocking said outlet end for allowing viscous mass to flow therethrough;

a sleeve having an open upper end, an open lower end, and a bore extending therethrough communicating said open upper end with said open lower end, said sleeve housed axially within said bore of said nozzle in spaced relation to said continuous sidewall, said open lower end of said sleeve positioned intermediate said inlet end and said outlet end of said nozzle in spaced-apart and diametrically opposed relation to said outlet end, said bore of said sleeve being operative for receiving said valve pin therethrough for guiding said valve pin between said extended position and said retracted position;

alignment means for aligning said sleeve within said bore of said nozzle in substantially axial alignment; and a cavity insert detachably engagable to said open outlet end of said nozzle and sealingly engagable to said cavity, said cavity insert having a bore communicating with said open outlet end when engaged thereto for receiving therethrough said valve tip when disposed in said extended position and for communicating viscous mass into and therethrough said cavity when said valve tip is disposed in said retracted position.

12. The nozzle assembly of claim 11, wherein said sleeve is detachably engagable to said bore of said nozzle.

13. The nozzle assembly of claim 11, wherein said valve pin is slidingly and sealingly engagable to said bore of said sleeve.

14. The nozzle assembly of claim 11, wherein said alignment means includes a plurality of spaced-apart fins extending radially outward from said sleeve, each having an outer endwall for engagement to said bore of said nozzle.

15. The nozzle assembly of claim 14, wherein said alignment means further includes a plurality of spaced-apart flange elements extending radially outward from said sleeve, each having an outer endwall for engagement to said bore of said nozzle, said plurality of spaced-apart flange elements spaced from said plurality of spaced-apart fins.

16. The nozzle assembly of claim 11, wherein said cavity insert includes an outer diameter sealingly engagable to said cavity for providing the sealing engagement between said cavity insert and said cavity.

\* \* \* \* \*